US010099608B2

(12) United States Patent
Cuddihy et al.

(10) Patent No.: US 10,099,608 B2
(45) Date of Patent: Oct. 16, 2018

(54) HAPTIC VEHICLE ALERT BASED ON WEARABLE DEVICE

(71) Applicant: Ford Global Technologies, LLC, Dearborn, MI (US)

(72) Inventors: Mark A. Cuddihy, New Boston, MI (US); Manoharprasad K. Rao, Novi, MI (US); Jialiang Le, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/598,255

(22) Filed: Jan. 16, 2015

(65) Prior Publication Data
US 2016/0207454 A1 Jul. 21, 2016

(51) Int. Cl.
*G08B 6/00* (2006.01)
*B60Q 9/00* (2006.01)

(52) U.S. Cl.
CPC ...... *B60Q 9/00* (2013.01); *G08B 6/00* (2013.01)

(58) Field of Classification Search
CPC ...... B60W 50/16; B60W 50/14; G08G 1/167; B60Q 9/008; B60Q 9/00; B60Q 9/001; B60Q 9/002; B60Q 9/003; B60Q 9/004; B60Q 9/005; B60Q 9/006; B60Q 9/007; G06F 3/016; G06F 3/0167; G06F 3/017; G08B 1/00; G08B 1/166; G08B 6/00
See application file for complete search history.

(56) References Cited

U.S. PATENT DOCUMENTS

| 4,361,834 A | 11/1982 | King |
| 6,734,790 B1 | 5/2004 | Hodger |
| 7,868,770 B2 | 1/2011 | Al-Mutairi |
| 8,301,108 B2 * | 10/2012 | Naboulsi ............... G08B 21/06 340/575 |
| 8,698,639 B2 | 4/2014 | Fung et al. |
| 9,290,125 B2 * | 3/2016 | Nagata .................. B60Q 9/008 |
| 2007/0108755 A1 | 5/2007 | Jones |
| 2009/0037104 A1 | 2/2009 | Basson et al. |
| 2013/0131905 A1 | 5/2013 | Green et al. |
| 2014/0111340 A1 | 4/2014 | Zohar |

(Continued)

FOREIGN PATENT DOCUMENTS

BR  PI0505897-0 A   9/2007
BR  MU8900703-4 U2  12/2010

(Continued)

OTHER PUBLICATIONS http://bothwinner.com/goods-3366-Driver+Alarm.html, "Driver alarm" Oct. 21, 2014, 2 pgs.

*Primary Examiner* — Van Trieu
(74) *Attorney, Agent, or Firm* — Frank A. MacKenzie; Brooks Kushman P.C.

(57) ABSTRACT

A vehicle includes a controller that communicates with a wearable device having a haptic mechanism. In response to an alert event detected by the vehicle, the controller outputs a signal to activate the haptic mechanism. The wearable device may detect a physiological or biometric characteristic such as pulse rate. The controller may output a signal to activate the haptic mechanism further in response to the pulse rate being less than a threshold. Also, the controller may output a signal to activate the haptic mechanism while the vehicle is operating autonomously.

14 Claims, 2 Drawing Sheets

(56) References Cited

U.S. PATENT DOCUMENTS

| | | | | |
|---|---|---|---|---|
| 2014/0168399 A1* | 6/2014 | Plummer | ................ | B60Q 9/00 |
| | | | | 348/78 |
| 2014/0340207 A1 | 11/2014 | Priest, III | | |
| 2015/0175172 A1* | 6/2015 | Truong | ................ | B60W 50/10 |
| | | | | 701/36 |
| 2015/0198448 A1* | 7/2015 | Sanma | ................... | G08G 1/166 |
| | | | | 701/400 |
| 2015/0338926 A1* | 11/2015 | Park | ........................ | G06F 3/011 |
| | | | | 345/156 |
| 2016/0009175 A1* | 1/2016 | McNew | ............. | H04N 13/0484 |
| | | | | 340/438 |
| 2016/0187651 A1* | 6/2016 | Border | ............... | G02B 27/0172 |
| | | | | 345/8 |

FOREIGN PATENT DOCUMENTS

| | | |
|---|---|---|
| CN | 103500488 A | 1/2014 |
| GB | 2362015 A | 11/2001 |
| JP | 2007022285 A | 2/2007 |
| WO | 2008/054460 A2 | 5/2008 |

\* cited by examiner

HAPTIC VEHICLE ALERT BASED ON WEARABLE DEVICE

TECHNICAL FIELD

This application is generally related to the integration of a wearable device with a haptic alert and a vehicle alert system coupled therewith.

BACKGROUND

Wearable devices with are available with haptic feedback, three-dimensional accelerometers and pulse sensors. Some wearable devices can measure movement of the wearer and are able to detect and record physical characteristics such as a pulse. Wearable devices also may be equipped with connection means including but not limited to Bluetooth, Ethernet, USB, WiFi, and IrDA, used to connect with a mobile phone running application software, a server connected with the cloud or a vehicle computing system.

SUMMARY

A control system for a vehicle includes at least one controller that is configured to communicate with a wearable device having a haptic mechanism. In response to an alert event detected by the vehicle, the controller outputs a signal to activate the haptic mechanism.

A vehicle includes a vehicle subsystem, and at least one controller configured to communicate with a wearable device. The wearable device is configured to detect a pulse rate and includes a haptic mechanism that outputs a vibration. The at least one controller will output a signal to activate the haptic mechanism in response to receiving an alert event generated by the vehicle subsystem and the pulse rate being less than a threshold.

A vehicle includes a vehicle control module configured to operate the vehicle in an autonomous mode and at least one controller. The at least one controller is configured to communicate with a wearable device having a haptic mechanism that outputs a vibration. In response to a signal from the vehicle control module indicative of an alert event received while in the autonomous mode, the at least one controller will output a signal to activate the haptic mechanism.

DETAILED DESCRIPTION

Figure 1:
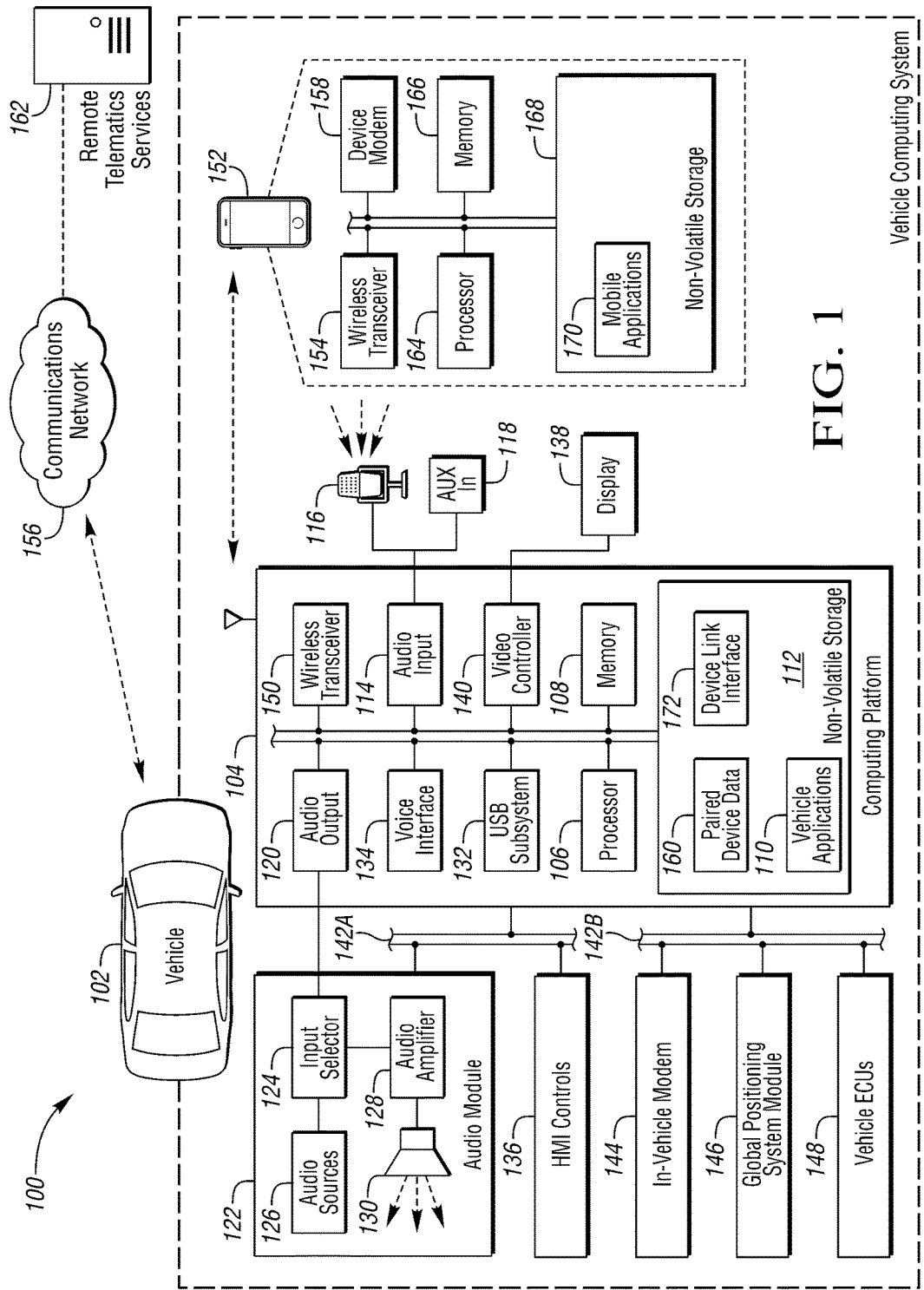
FIG. 1 is an exemplary block topology of a vehicle infotainment system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

This disclosure, among other things, proposes vehicular systems and methods for alerting a driver to a vehicle alert condition such as an adaptive cruise control alert, a lane departure alert, a powertrain alert, a pedestrian detection alert, a collision avoidance alert, a blind spot alert, a drowsy driver alert, a distracted driver alert, an active safety alert, a stability control alert, or a park assist alert. The alert includes a signal based on the vehicle alert condition and communicating the signal with a wearable device. The wearable device may alert the driver wearing the wearable device via a haptic mechanism. For example, a vehicle pulling into an open gap in a lane between two vehicles traveling in the lane, thus reducing the distance between vehicles, may cause an adaptive cruise control alert. Another example is a stability control alert that may include detection of a change in road surface traction that the vehicle is traveling on. These alerts may alert a driver to a condition faster than an operator is able to perceive them.

Typical automotive alerts may involve illuminating a light in front of the driver or sounding an audible alarm, or both. Because alerts happen periodically during normal driving, and many have similar visual and audio characteristics, drivers may ignore them. In order to address this concern, the alert events may be classified as non-standard alerts and standard alerts. Examples of non-standard alerts include pedestrian detection, collision avoidance, blind spot detection, drowsy driver, and distracted driver. Examples of standard alerts may include low windshield wiper fluid, oil change needed or a loss of communication with a TPMS sensor or certain check engine conditions. The vehicle may be configured to provide standard visual or audible alerts through its message center for certain standard alerts, and the vehicle may be configured to provide standard visual and audible alerts plus haptic alert via wireless communication (such as Bluetooth, WiFi, or RFID) to a wearable device.

The vehicular systems may include vehicular sub-systems and distributed functionality occurring in the vehicle. The vehicle systems and sub-systems may communicate with other vehicular modules via a wire-line or wireless communication protocol. The communication protocol may include but is not limited to wire connections such as CAN, LIN, FlexRay, and Ethernet, and wireless connections such as high frequency communication connections (greater than one gigahertz) such as WiFi, and Bluetooth or lower high frequency communication connections (less than one gigahertz) such as RKE. The vehicular sub-system may communicate either directly or indirectly with a wearable device. The wearable device is a device that may be affixed to a person such that the person is not required to hold the device. Examples of wearable device may include but is not limited to a wrist band, a smart watch, a necklace, a chest band, a smart ring, or eye glasses. A mobile phone may be considered a wearable device if configured to attach onto a belt or sized to fit into a person's pocket. Also, an article of clothing equipped with electronics is a wearable device, such as a shirt or vest. The wearable device includes a wire-line or wireless communication port such as WiFi and Bluetooth, and may include motion sensors such as accelerometers and gyroscopes, and may include other circuitry including circuitry capable of determining a location. The location determination may be a geographical location such as from a GPS unit, or a relative location such as one triangulated within the passenger compartment of a vehicle.

The wearable device may include a haptic mechanism such as a vibrating mechanism. The vibrations may be generated by multiple means including a small electric motor spinning an off-balance or offset weight, an electroactive polymer and a piezoelectric bender. Another form of haptic feedback may be an electrovibration which is a sensation of vibration that occurs when a modulated voltage and current is applied to a conductive pad in contact with the skin of a person. Also, the haptic mechanism may produce an electric shock to alert the person. The haptic feedback may provide a more noticeable indication to the driver, and therefore may be used for alerts deemed as 'non-standard'. By limiting the haptic feedback only to alerts which require immediate driver reaction, the driver can react faster to these alerts by bypassing the interpretation step required by audible or visual alerts to determine the appropriate response.

FIG. 1 illustrates an example diagram of a system 100 that may be used to provide telematics services to a vehicle 102. The vehicle 102 may be one of various types of passenger vehicles, such as a crossover utility vehicle (CUV), a sport utility vehicle (SUV), a truck, a recreational vehicle (RV), a boat, a plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. The processor may also be multiple processors in multiple computing units which each perform a part of the overall driver alert. For example, one processor may perform audible alert functions, located in the audio module (122), while a different processor in the video controller (140) handles the visual alert, predicated from the same alert message. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142A, and the vehicle modem 144, GPS module 146, and vehicle ECUs 148 may communicate with the computing platform 104 over a second in-vehicle network 142B. In other examples, the computing platform 104 may be connected to more or fewer in-vehicle networks 142. Additionally or alternatively, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. The wireless modules may transmit data at a carrier frequency or a center frequency. The center frequency is an important aspect of a wireless system by impacting noise immunity and bandwidth. For example, typical remote keyless entry systems operate at 315 MHz in the United States, and 433 MHz in Europe, while WiFi and Bluetooth may operate at frequencies including frequencies over 2 GHz such as 2.4 GHz. Additionally or alternatively, the computing platform 104 may communicate with the mobile device 152 over a wired connection, such as via a USB connection between the mobile device 152 and the USB subsystem 132.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnect to the mobile devices 152 referenced in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics services 162. In one example, the computing platform 104 may utilize a data-over-voice plan or data plan of the mobile device 152 to communicate information between the computing platform 104 and the communications network 156. Additionally or alternatively, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics services 162 or other network services via the device modem 158. The computing platform 104 may also include a device link interface 172 to facilitate the integration of functionality of the mobile applications 170 into the grammar of commands available via the voice interface 134. The device link interface 172 may also provide the mobile applications 170 with access to vehicle information available to the computing platform 104 via the in-vehicle networks 142. An example of a device link interface 172 may be the SYNC APPLINK component of the SYNC system provided by The Ford Motor Company of Dearborn, Mich.

Figure 2:
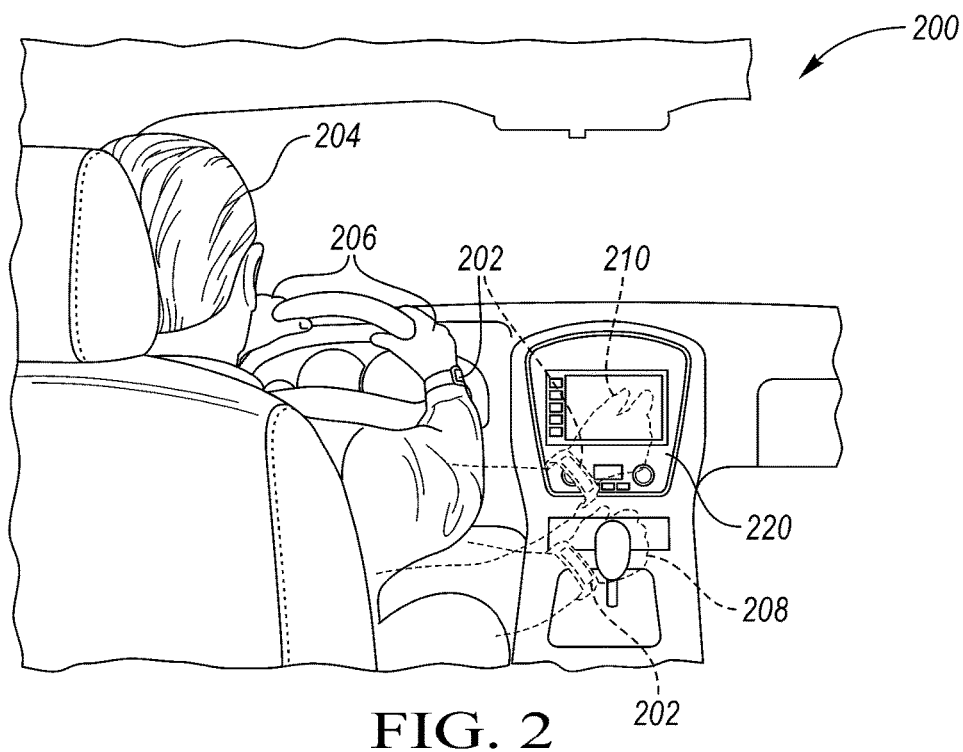
FIG. 2 is an exemplary illustration of a vehicle interior including a vehicle infotainment system and an occupant wearing a wearable device.

FIG. 2 is an exemplary illustration of a vehicle interior 200 including a vehicle infotainment system 220 and an occupant 204 within the vehicle interior 200. The occupant 204 may wear a wearable device 202. The wearable device 202 may be a smart fitness band, a smart watch, a smart phone wrist band, or other electronic system attached to a vehicle occupant's wrist, but may also be clipped to a belt, worn as a necklace, a ring, a vest, a chest band, a waist band or eye glasses. The wearable device 202 may be equipped with a haptic mechanism and sensors. The sensors may include an accelerometer (e.g., 3-axis accelerometer), a gyroscope, a magnetometer or a pulse sensor. The wearable device may detect a pulse, or other physiological and biometric characteristics. The detected physiological and biometric characteristics may be evaluated by a controller in the vehicle. The evaluation may be used to qualify an alert message or alert signal. Since the communication between the vehicle and the wireless device can be used for many features (such as streaming audio), the alert signals will incorporate a method for prioritizing alert messages above any ongoing communication in order to send the driver alerts in a timely manner. For example, if the vehicle outputs a drowsy driver alert and the driver's pulse rate is below a threshold, the vehicle may output alert indication and in parallel, interrupt any ongoing communications between the vehicle and the wireless/wearable device, in order to immediately output a signal to a wearable device worn by the driver to activate a haptic mechanism to alert the driver. The haptic signal provided by the wearable device provides a superior alert since it is always physically in contact with the driver.

The use of a haptic wrist band is advantageous if the occupant 204 is a driver of the vehicle with the driver's hands on the steering wheel in a driving position 206, on a shift lever 208, or if the driver's hands are not in contact with anything as shown in 210 such as during transitions between contact with the steering wheel and vehicular control systems (e.g., HVAC controls, infotainment controls, window controls, and navigation system controls). Likewise, a driver's hands may not be in contact with the steering wheel in the event that the vehicle is an autonomous vehicle and the vehicle is operating autonomously. While the vehicle is operating autonomously, the vehicle may utilize lane detection, such as a vision lane detection system, to maintain operation in a desired road lane. In the event of an error in the vision lane detection system, a lane detection alert may occur. The error may include loss of a signal from a sensor or a camera obstruction. Lane detection is different from lane departure, which occurs when the vehicle is operating in a semi-autonomous mode in which a driver is controlling the operation of the vehicle and a lane departure alert occurs when the vehicle travels outside of the intended lane.

Figure 3:
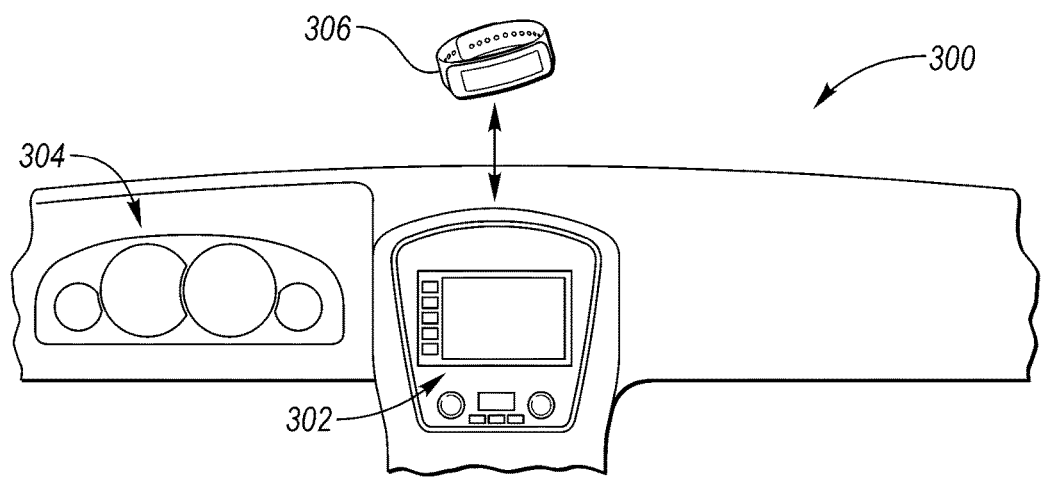
FIG. 3 is an exemplary wearable device in communication with a vehicle based computing system.

FIG. 3 is an exemplary illustration of a vehicle interior, specifically a vehicle dash board 300 including a vehicle infotainment system 302 and a vehicle instrument cluster 304. The vehicle system or sub-system may be coupled with the infotainment system 302 or vehicle instrument cluster 304 via a wire connection including a CAN bus, a Flexray bus, an Ethernet bus, or a MOST bus or may be connected via a wireless connection. The vehicle infotainment system 302 and vehicle instrument cluster 304 may be coupled to a wearable device 306 via a wireless connection including Bluetooth, WiFi, or inductive coupling. The wearable device 306 may communicate with the controller via a wireless or wire connection. The wearable device 306 may be equipped with sensors that can measure physiological and biometric signals such as pulse, respiration and skin conductance. The sensors can output signals which can be processed by the wearable device 306, or an associated mobile device 152 or a processor 106 of the vehicle computing platform. Signals indicative of physiological and biometric characteristics such as heart rate and respiration rate may be expressed as analog or digital signals which may be displayed on a display such as the instrument cluster 304 or the infotainment display for enhanced visibility to the device wearer. The device wearer can conveniently monitor these larger and conveniently located displays without the need for looking for those signals on the wearable device 306 or the associated mobile device 152.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A control system for a vehicle comprising:
   at least one controller configured to
      communicate with a wearable device having a haptic mechanism via a mobile phone paired with the at least one controller and wearable device, and
      in response to an alert event detected by the vehicle, output a signal to the mobile phone to activate the haptic mechanism.

2. The system of claim 1, wherein the at least one controller is further configured to communicate with the wearable device using a radio frequency band of one gigahertz or greater.

3. The system of claim 1, wherein the alert event is indicative of a lane departure alert, a pedestrian detection alert, a distracted driver alert, a drowsy driver alert, a blind spot alert, a collision avoidance alert, a park assist alert, a powertrain alert, or an adaptive cruise control alert.

4. The system of claim 1 further comprising a navigation system in communication with the at least one controller, wherein the alert event detected by the vehicle is generated by the navigation system.

5. The system of claim 1, wherein the wearable device is a smart wrist band or a smart wrist watch.

6. A vehicle comprising:
a vehicle subsystem configured to generate alert events; and
at least one controller configured to
communicate with a wearable device, configured to detect a pulse rate and having a haptic mechanism that outputs a vibration, via a mobile phone paired with the at least one controller and wearable device, and
output a signal to the mobile phone to activate the haptic mechanism in response to receiving an alert event generated by the vehicle subsystem and the pulse rate being less than a threshold value.

7. The vehicle of claim 6, wherein the at least one controller is further configured to communicate with the wearable device using a radio frequency band of one gigahertz or greater.

8. The vehicle of claim 6, wherein the wearable device is a smart wrist band or a smart wrist watch.

9. The vehicle of claim 6, wherein the alert event is a drowsy driver alert or an inattentive driver alert.

10. A vehicle comprising:
a vehicle control module configured to operate the vehicle in an autonomous mode; and
at least one controller configured to
communicate with a wearable device, having a haptic mechanism that outputs a vibration, via a mobile phone paired with the at least one controller and wearable device, and
in response to a signal from the vehicle control module indicative of an alert event received while in the autonomous mode, output a signal to the mobile phone to activate the haptic mechanism.

11. The vehicle of claim 10, wherein the at least one controller is further configured to communicate with the wearable device using a radio frequency band of one gigahertz or greater.

12. The vehicle of claim 10, wherein the alert event is indicative of a lane detection alert, a park assist alert, or a powertrain alert.

13. The vehicle of claim 10 further comprising a display coupled to the at least one controller, wherein the at least one controller is further configured to provide output to the display indicative of physiological or biometric characteristics received from the wearable device.

14. The vehicle of claim 10, wherein the wearable device is a smart wrist band or a smart wrist watch.

* * * * *